US008908033B2

(12) United States Patent
Lehane et al.

(10) Patent No.: US 8,908,033 B2
(45) Date of Patent: Dec. 9, 2014

(54) UTILIZING PRESENCE INFORMATION FOR THE PURPOSE OF ENHANCED SURVEILLANCE (75) Inventors: Bart Lehane, Dublin (IE); Gerry Donohoe, Dublin (IE)

(73) Assignee: Avaya Inc., Basking Ridge, NJ (US)

( * ) Notice: Subject to any disclaimer, the term of this patent is extended or adjusted under 35 U.S.C. 154(b) by 899 days.

(21) Appl. No.: 12/569,005

(22) Filed: Sep. 29, 2009

(65) Prior Publication Data

US 2011/0074951 A1 Mar. 31, 2011

(51) Int. Cl.
*H04N 7/18* (2006.01)
(52) U.S. Cl.
CPC .................................... *H04N 7/181* (2013.01)
USPC ........... 348/143; 348/152; 348/153; 348/154; 348/155
(58) Field of Classification Search
CPC .... H04N 7/181; H04N 7/188; H04L 65/4076; H04L 29/06027; H04L 67/125; H04L 67/025; G08B 13/2402; G08B 13/19663; G08B 13/19656; G05B 2219/40425; G01S 13/56; B25J 9/1664
USPC .......................................... 348/143, 152–155
See application file for complete search history.

(56) References Cited

U.S. PATENT DOCUMENTS

| | | | | |
|---|---|---|---|---|
| 6,345,390 | B1 * | 2/2002 | Eto et al. ........................ | 725/127 |
| 8,471,910 | B2 * | 6/2013 | Cleary et al. ................... | 348/159 |
| 2002/0054666 | A1 * | 5/2002 | Kliland ............................ | 379/39 |
| 2003/0038878 | A1 * | 2/2003 | Lee et al. ........................ | 348/143 |
| 2004/0119820 | A1 * | 6/2004 | Nagao et al. ................... | 348/143 |
| 2005/0010797 | A1 | 1/2005 | Rushworth | |
| 2005/0057653 | A1 * | 3/2005 | Maruya .......................... | 348/159 |
| 2005/0086704 | A1 * | 4/2005 | Rhodes et al. ................. | 725/136 |
| 2005/0111701 | A1 * | 5/2005 | Seki et al. ...................... | 382/107 |
| 2005/0168576 | A1 * | 8/2005 | Tanahashi ...................... | 348/159 |
| 2005/0222810 | A1 | 10/2005 | Buford et al. | |
| 2005/0228763 | A1 | 10/2005 | Lewis et al. | |
| 2006/0005136 | A1 * | 1/2006 | Wallick et al. ................. | 715/726 |
| 2006/0061664 | A1 * | 3/2006 | Ito ............................. | 348/211.11 |
| 2006/0078047 | A1 * | 4/2006 | Shu et al. .................. | 375/240.01 |
| 2006/0170773 | A1 * | 8/2006 | Rye et al. ....................... | 348/159 |
| 2006/0204229 | A1 * | 9/2006 | Onodera ........................ | 386/117 |
| 2007/0019077 | A1 * | 1/2007 | Park ........................... | 348/211.99 |
| 2007/0035627 | A1 * | 2/2007 | Cleary et al. ................... | 348/159 |
| 2007/0254716 | A1 * | 11/2007 | Matsuoka et al. ............. | 455/561 |
| 2008/0158336 | A1 * | 7/2008 | Benson et al. ............. | 348/14.08 |
| 2008/0225121 | A1 * | 9/2008 | Yoshida et al. ................ | 348/159 |
| 2009/0077484 | A1 * | 3/2009 | Ohmori ......................... | 715/771 |
| 2009/0080715 | A1 * | 3/2009 | van Beek et al. ............. | 382/118 |
| 2009/0092283 | A1 | 4/2009 | Whillock et al. | |
| 2009/0219387 | A1 * | 9/2009 | Marman et al. ............... | 348/143 |
| 2009/0224912 | A1 * | 9/2009 | Sobol ............................ | 340/541 |
| 2009/0322881 | A1 * | 12/2009 | Shu et al. ...................... | 348/148 |
| 2010/0002071 | A1 * | 1/2010 | Ahiska ............................ | 348/36 |
| 2010/0007736 | A1 * | 1/2010 | Mori et al. ..................... | 348/155 |
| 2010/0149399 | A1 * | 6/2010 | Mukai et al. .............. | 348/333.02 |
| 2010/0153003 | A1 * | 6/2010 | Merkel et al. ................. | 701/201 |
| 2012/0033100 | A1 * | 2/2012 | Harikae et al. ............. | 348/223.1 |

* cited by examiner

Primary Examiner — Alina N Boutah
(74) Attorney, Agent, or Firm — Sheridan Ross P.C.

(57) ABSTRACT

Surveillance system endpoints communicate with each other to send and receive presence information. The surveillance endpoints may react to the received presence information. For example, if one surveillance camera stops functioning, one or more other cameras can react to the presence information, or lack thereof, sent from the malfunctioning camera. Thus, one or more of the other cameras can cover the area normally covered by the malfunctioning camera. Thus, the surveillance endpoints can automatically react to presence events in a network of surveillance endpoints.

20 Claims, 9 Drawing Sheets

UTILIZING PRESENCE INFORMATION FOR THE PURPOSE OF ENHANCED SURVEILLANCE

BACKGROUND

Surveillance has become important to many organizations, property owners, businesses, security agencies, etc. Generally, surveillance is conducted either by people or with various sensors. The sensors can include motion detectors, weight sensitive sensors, infrared sensors, audio sensors, video cameras, etc. The information from the sensors is generally provided to a person, security firm, police, or other entity that can respond to a possible problem.

Figure 1A:
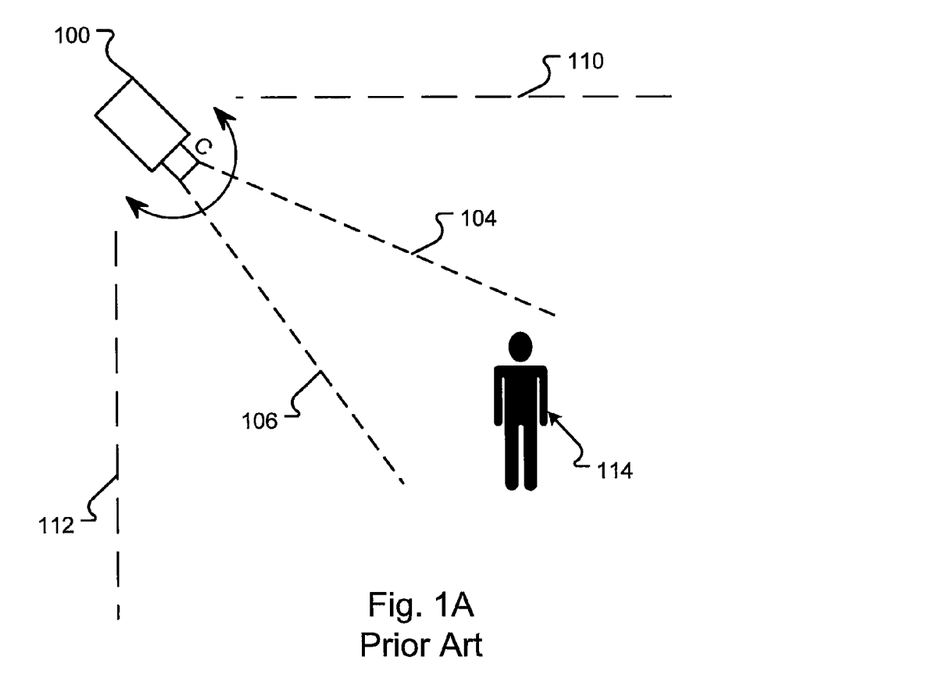
FIGS. 1A through 1C are block diagrams of prior art surveillance systems.
Figure 1B:
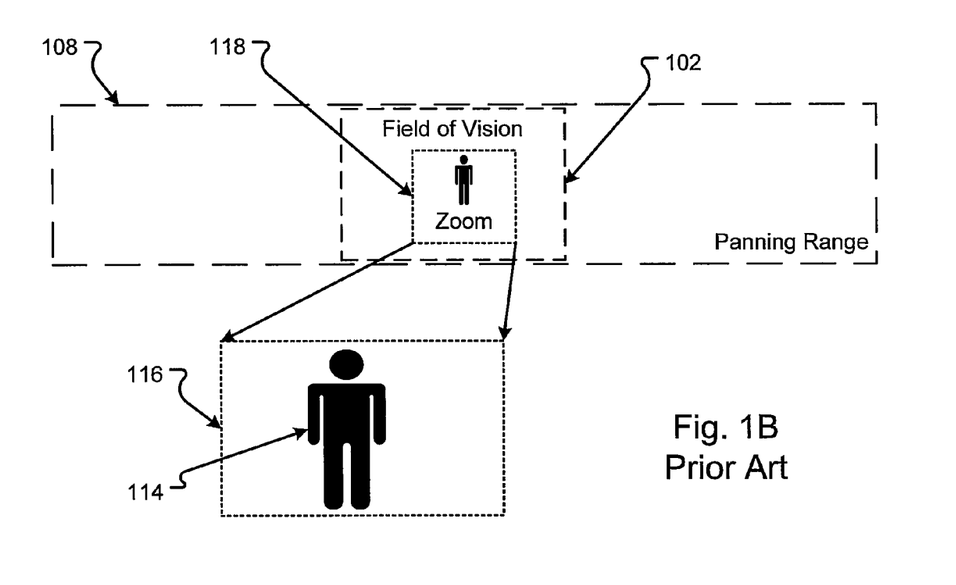

Video cameras are generally used more widely than other sensor systems. An example video camera 100 is shown in FIG. 1A. A depiction of what the camera 100 displays on a monitor is shown in FIG. 1B. The camera 100 can have a defined field of vision represented by box 102 and defined generally by lines 104 and 106. The field of vision 102 is the area of a scene that can be viewed and recorded by the camera 100. The camera 100 may also be able to pan. Panning is the physical movement of a camera 100 generally sweeping along one or more planes of motion. The range of the pan is represented by box 108 and defined by lines 110 and 112. The cameras may also be able to tilt, which is similar to panning in a vertical plane. Further, the camera 100 may be able to zoom. Zooming is the action of changing the focal length of the lens on the camera to enlarge an image in the field of vision 102. An enlarged view of a subject 114 is shown in box 116, which is an enlargement of area.

Figure 1C:
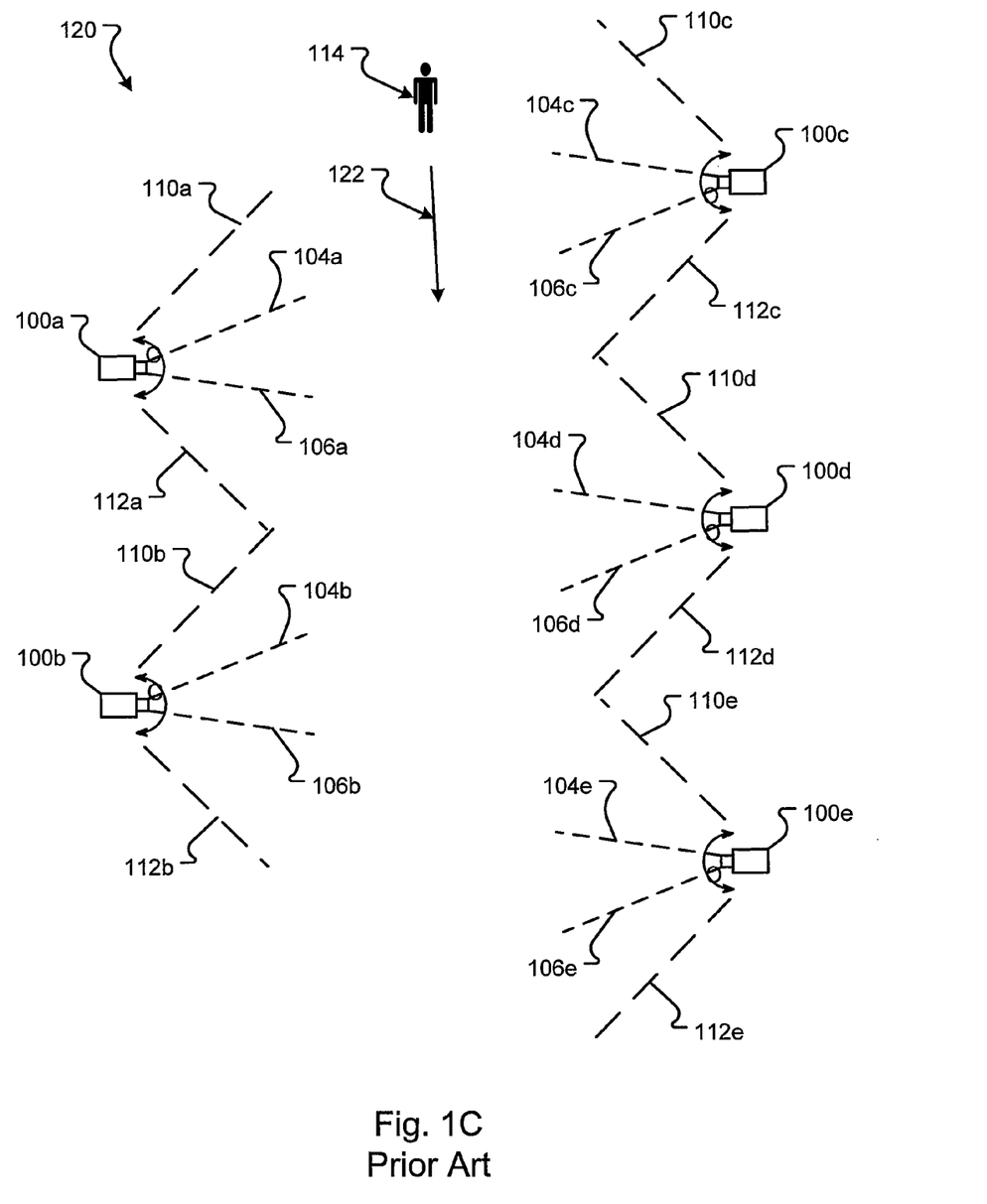

A camera network 120 is shown in FIG. 1C. Here, several cameras 100a through 100e view a larger area. Each camera can have its own field of vision 104 to 106 and panning range 110 to 112. However, when the area to be covered is too large to be recorded by one camera, the several cameras 100a through 100e are used in concert to cover the area. Thus, as a subject 114 travels along path 122, the cameras 110a through 100e can view and record the subject 114 over the area.

While many cameras can execute panning or zooming, most video cameras or other surveillance devices have little intelligence. The cameras cannot change or control their own operation. Generally, the cameras are controlled by a separate system that is operated by a person. Thus, a camera network generally requires several people to operate the cameras over a day, week, month, etc. Further, if an event occurs, the security event requires the personnel that operate the camera network to respond. As such, events can be missed if the security personnel are not attentive.

SUMMARY

It is with respect to the above issues and other problems that the embodiments presented herein were contemplated. The embodiments of systems and methods presented herein provide surveillance endpoints that can send and receive presence data or information. The surveillance endpoints may react to the received presence information. For example, if one camera stops functioning, one or more other cameras can react to the presence information sent from, or the lack of presence information from, the malfunctioning camera. Thus, one or more of the other cameras can cover the area normally covered by the malfunctioning camera.

Numerous advantages are realized by the embodiments described herein. The embodiments address issues that arise in large scale surveillance environments. Namely, endpoints (e.g., cameras, microphones, etc.), in prior surveillance systems, are independent of each other and not aware of each other's state when surveying large areas. This independence means that the endpoints may miss important events that occur and could lead to security breaches. There are numerous surveillance systems in existence. In general, most of these systems use independent cameras, each focusing on a pre-defined area, or else use a free-form camera with a human operator that scans a wider area.

Much of the ongoing research and development in the area of video surveillance focuses on aspects such as event detection and target tracking using audio-visual analysis methods. In contrast, the embodiments of endpoints described herein can monitor events better and can communicate state information more freely between each other and use this information to enhance efficiency. This interconnectedness adds intelligence to the endpoints in a surveillance environment, which enables cooperation between these endpoints and leads to enhanced surveillance capabilities.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. It will be understood that various changes may be made in the function and arrangement of elements without departing from the spirit and scope of the invention as set forth in the appended claims.

Figure 2:
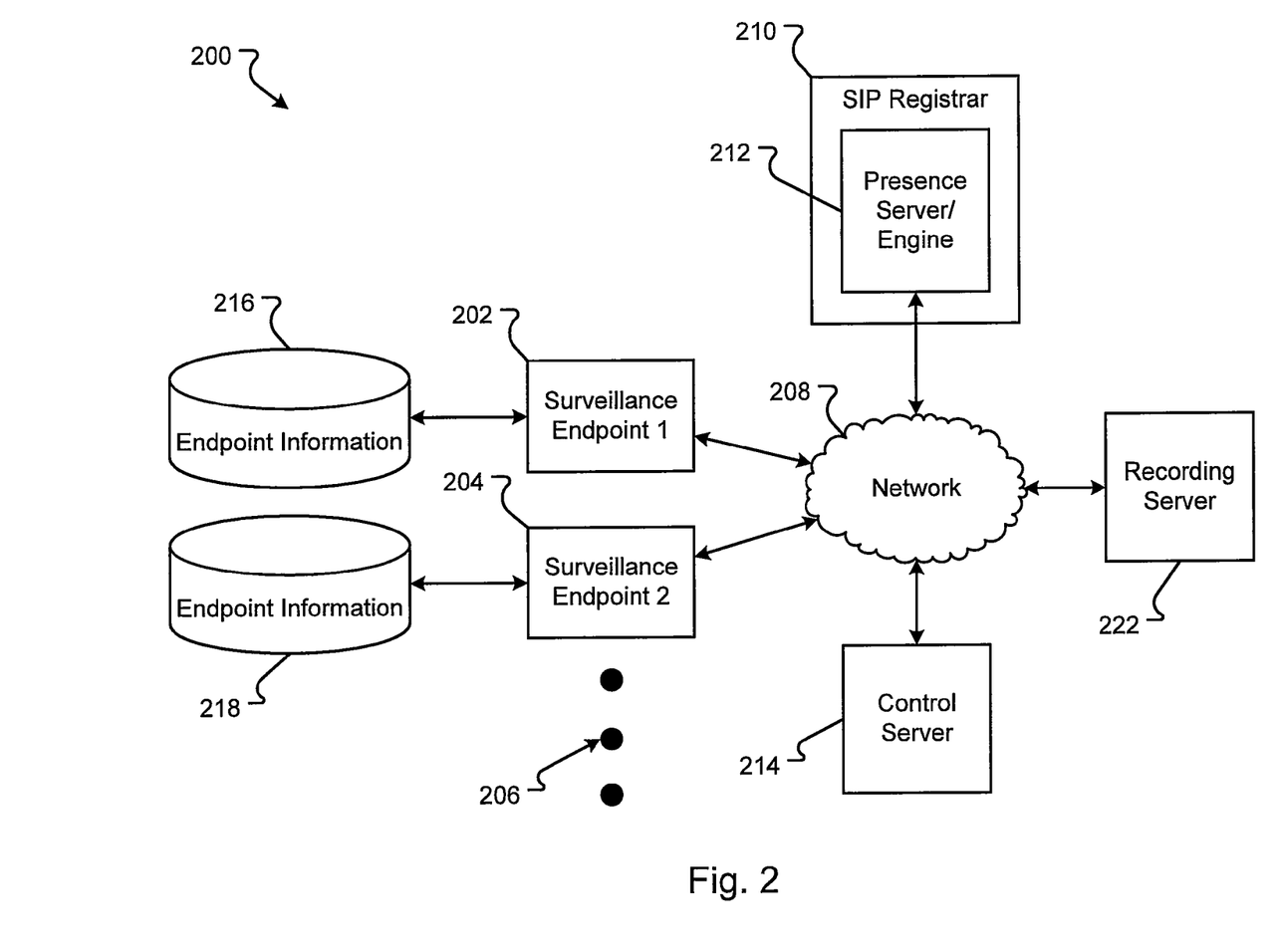
FIG. 2 is a block diagram of an embodiment of an interconnected surveillance system sharing presence information.

An embodiment of an interconnected surveillance system 200 is shown in FIG. 2. The system 200 can include one or more components. The components in the system 200 can be hardware, software, or a combination of hardware and software. In embodiments, the servers or computer systems described in conjunction with FIG. 2 are as described in conjunction with FIGS. 7 and 8. The servers and functions described in conjunction with FIG. 2 may also be software applications executing on one or more servers or computer systems that are described in conjunction with FIGS. 7 and 8. Further, the components described herein may be in communication with each other. The components can communicate through any known system or protocol, some of which are described in conjunction with FIGS. 7 and 8.

In embodiments, the system 200 comprises one or more surveillance endpoints 202 and 204. The system 200 may have fewer or more surveillance endpoints than shown in FIG. 2, as represented by ellipses 206. The surveillance endpoints 202 and 204 can be any type of surveillance equipment. For example, the surveillance endpoints 202 and 204 can be motion detectors, weight sensitive sensors, infrared sensors, audio sensors, fixed video cameras, movable video cameras, etc. The surveillance endpoints 202 and 204 can communicate with a network 208. The network 208 can include any system, method, or protocol for communicating data; exemplary embodiments of the network 208 are described in conjunction with FIGS. 7 and 8. The surveillance endpoints 202 and 204 may send presence information, receive presence information from one or more other surveillance endpoints, and/or automatically react to the presence information from the one or more other surveillance endpoints. The reaction of the surveillance endpoints 202 and 204 can be as described in conjunction with FIG. 4.

The system 200 can further include a session initiation protocol (SIP) registrar 210. The SIP registrar 210 can execute a presence server or engine 212. The presence server 212 can register the surveillance endpoints 202 and 204. After registering the surveillance endpoints 202 and 204, the presence server 212 can provide presence information to at least one of the surveillance endpoints 202 and 204. Providing presence information and determining presence can be as described in U.S. patent application Ser. No. 7,171,473, entitled "System using HTTP protocol for maintaining and updating on-line presence information of new user in user table and group table," issued Jan. 30, 2007, and U.S. Patent Publication No. 20070067443, entitled "Presence-based hybrid peer-to-peer communications," filed Sep. 30, 2005, which are incorporated herein in their entirety for all that the patents teach. Presence information and the determination of presence can be as further described in the Network Working Group Request for Comments: 2778, authored by M. Day, J. Rosenberg, and H. Sugano, published by the Internet Engineering Task Force on February 2000, and entitled "A Model for Presence and Instant Messaging," which is incorporated herein in the document's entirety for all that the document teaches. The presence server 212 can provide the presence information for the two or more surveillance endpoints 202 and 204.

The presence server 212 may also provide presence information to other components, for example, a recording server 222 and/or a control server 214. The recording server 222 can record the multimedia display or the other surveillance data from the surveillance endpoints 202 and/or 204. The control server 214 may be operable to control automatically the one or more surveillance endpoints 202 and 204. In embodiments, the control server 214 acts as a central control for the one or more surveillance endpoints 202 and 204. In other embodiments, the surveillance endpoints 202 and 204 are operable to control their own functions, in a distributed manner, without the controlling server 214. The surveillance endpoints 202 and 204 can communicate with an endpoint information database 216 and/or 218. The endpoint information database 216 and/or 218 may be stored at the surveillance endpoints 202 and 204 or may be stored centrally and interfaced by the surveillance endpoints 202 and 204. The endpoint information database 216 stores information (e.g., panning range, current pointing direction, focus, zoom settings, location, etc.) for surveillance endpoint 204 and, if there are other surveillance endpoints, for the other surveillance endpoints. Similarly, endpoint information database 218 stores information (e.g., panning range, current pointing direction, focus, zoom settings, location, etc.) for surveillance endpoint 202 and, if there are other surveillance endpoints, the other surveillance endpoints. Thus, each surveillance endpoint can access and retrieve information about the other surveillance endpoints. In other embodiments, the endpoint information database 216 and/or 218 is accessed by the control server 214.

Further, the system 200 can include a recording server 222. The recording server 222 may record all data from the surveillance endpoints 202 and/or 204 or may only record events. Events may be automatically triggered by a presence event sent from the surveillance endpoints 202 and/or 204 or by a user interface signal. The recorded content created by the recording server 222 can be stored in a memory or database as described in conjunction with FIGS. 7 and 8. In embodiments, the recording server 222 may be another surveillance endpoint.

Figure 3:
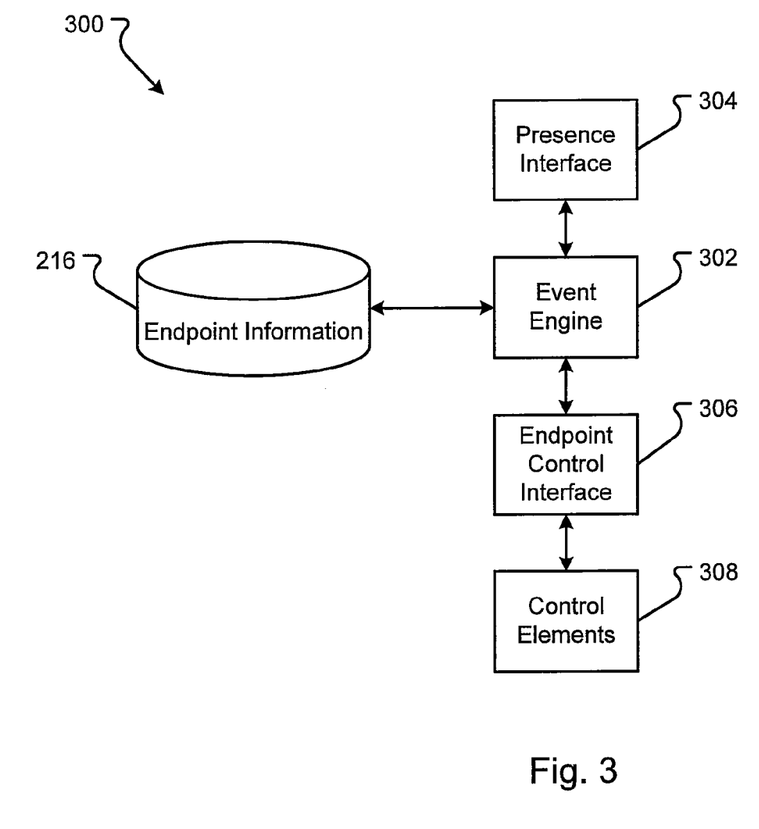
FIG. 3 is a block diagram of an embodiment of a surveillance endpoint or other component in the surveillance system operable to send and/or receive presence information, and/or react to the presence information.

An embodiment of a surveillance endpoint 300 that may be the same as or similar to the surveillance endpoints 202 and/or 204 is shown in FIG. 3. The surveillance endpoint 300 represents an intelligent surveillance endpoint that both sends presence information and responds to presence information received from other surveillance endpoints. It should be noted that some or all of the functionality described in conjunction with FIG. 3 may be executed by the control server 214 and/or the recording server 222. The components in system 300 can be hardware, software, or a combination of hardware and software. In embodiments, the components described in conjunction with FIG. 3 are computer systems or servers as described in conjunction with FIGS. 7 and 8. The components and functions described in conjunction with FIG. 3 may also be software applications executing on one or more servers or computer systems that are described in conjunction with FIGS. 7 and 8. Further, the components described herein may be in communication with each other. The components can communicate through any system or protocol, some of which are described in conjunction with FIGS. 7 and 8.

The surveillance endpoint 300 can include a presence interface 304. The presence interface 304 is the hardware and/or software that receives and/or sends presence information. For example, the presence information of the surveillance endpoint 300 can be broadcast by the presence interface 304 to one or more other surveillance endpoints or to the presence server 212. The presence information can be sent periodically, such as every second, every minute, etc. The presence interface 304 can also receive presence information from the presence server 212 or other surveillance endpoints. In embodiments, the presence interface 304 registers with the presence server 212 to receive presence information from one or more other surveillance endpoints. The presence interface 304 may give the identities of the other surveillance endpoints from which the surveillance endpoint 300 desires presence information. In other embodiments, the presence server 212 determines and provides the presence information desired by the surveillance endpoint 300.

An event engine 302 can communicate with the presence interface 304. The event engine 302 can determine an event occurring at the surveillance endpoint 300 that requires presence information to be sent by the presence interface 304. For example, if the surveillance endpoint 300 fails or begins to focus on an occurrence in the surveillance endpoint's area of coverage, the event engine 302 can determine the proper presence information to send. Further, the event engine 302 can determine how to respond to presence information being received from other surveillance endpoints.

The event engine 302 can also communicate with the endpoint information database 216 to receive and/or store information about at least one other surveillance endpoint. Further, the event engine 302 may communicate with an endpoint control interface 306. An endpoint control interface 306 can control the one or more electrical or electromechanical parts, referred to as the control elements 308, of the surveillance endpoint 300. The control elements can change a physical condition of the surveillance endpoint. For example, the control elements 308 can be the servo motors that control the panning function, the focus, the zoom, or other functions, the signal filters, the amplifiers, or other functions of the surveillance endpoints.

Figure 4:
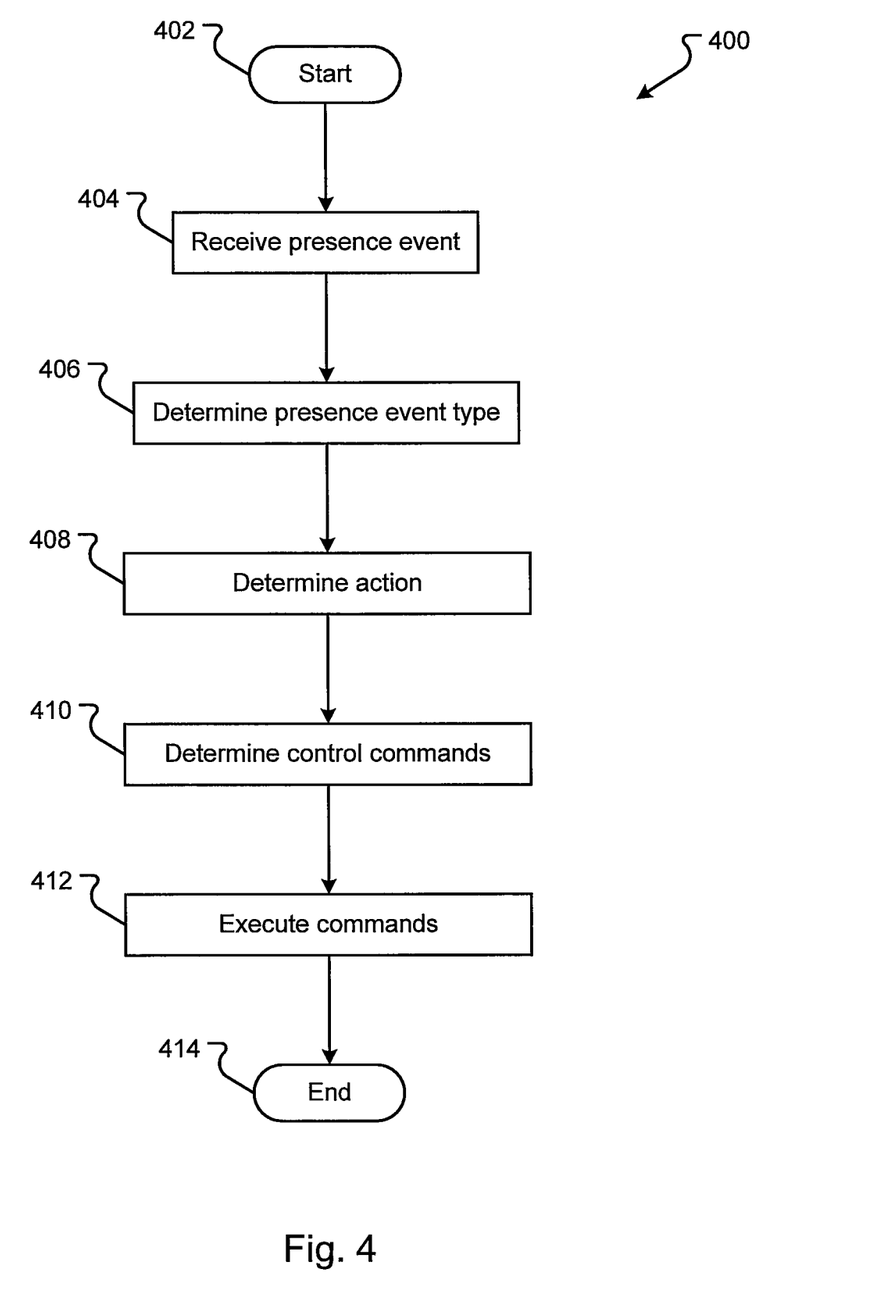
FIG. 4 is a flow diagram of an embodiment of a process for reacting to presence information from a surveillance endpoint.

An embodiment of a method 400 for automatically adjusting a surveillance based on presence information is shown in FIG. 4. Generally, the method 400 begins with a start operation 402 and terminates with an end operation 414. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, software, data structures, etc. described in conjunction with FIGS. 1-3.

An event can occur that requires a response by the surveillance endpoint 300. For example, a camera in a network of cameras may fail. The presence interface 304 receives this presence event in step 404. The presence event can be determined by the event engine 302 based on the received presence information. In some situations, there may be one or more items of presence information that create an event, and the presence information that can create an event may be less that all the presence information from all the surveillance endpoints. In other words, the event engine 302 filters the incoming presence information looking for one or more predetermined signals that create a presence event. For example, presence information of "normal" would not generate a presence event. However, presence information of "malfunction" can create a status event. In other embodiments, the presence server 212 only sends presence events to the surveillance endpoints. The presence server 212 filters the presence information and only broadcasts presence information that creates events.

In response to determining that there has been a presence event, the event engine 302 can determine the type of presence event. The various presence events can be one of, but are not limited to, malfunction, off, general surveillance, event tracking, etc. Malfunction means the surveillance endpoint is not operating within normal parameters or is not functioning. Off means the surveillance endpoint is not operating or is powered off. General surveillance means the surveillance endpoint is functioning normally and is not focused on an event but completing a general signal or information sweep of the area of coverage for the surveillance endpoint. Event tracking means the surveillance endpoint is focused on an event, either automatically or as a result of human operator signal. From the presence information, the event engine 302 determines the type of event. For example, if the presence information is malfunction, the event type is malfunction.

After determining the event type, the event engine 302 can determine the action required, if any action is required, to respond to the event in step 408. The event engine 302 can access the endpoint information database 218 to determine where the surveillance endpoint that is associated with the presence event is located, what area the surveillance endpoint covers, and other information. The event engine 302 can compare that information to information about the surveillance endpoint 300 with which the event engine 302 is associated. Then, from the comparison, the event engine 302 can determine if the surveillance endpoint 300 can respond (i.e., can cover the area, can zoom in on the same event, etc.). If the surveillance endpoint 300 can respond, the event engine 302 determines how to respond, such as by moving the surveillance endpoint focus to a determined location, changing the zoom to a determined setting, changing a panning setting of the surveillance endpoint, etc.

Based on the actions that the event engine 302 determined, the event engine 302 determines the control commands to send to the endpoint control interface 306, in step 410. The control commands enact the actions determined by the event engine 302. The endpoint control interface 306 then sends the commands to the control elements 308. One or more control elements 308 execute the commands, in step 412. The control elements control a physical condition of the surveillance endpoint, for example, the direction of focus for a camera, the focus amount of a lens, the panning of a camera, etc.

Figure 5:
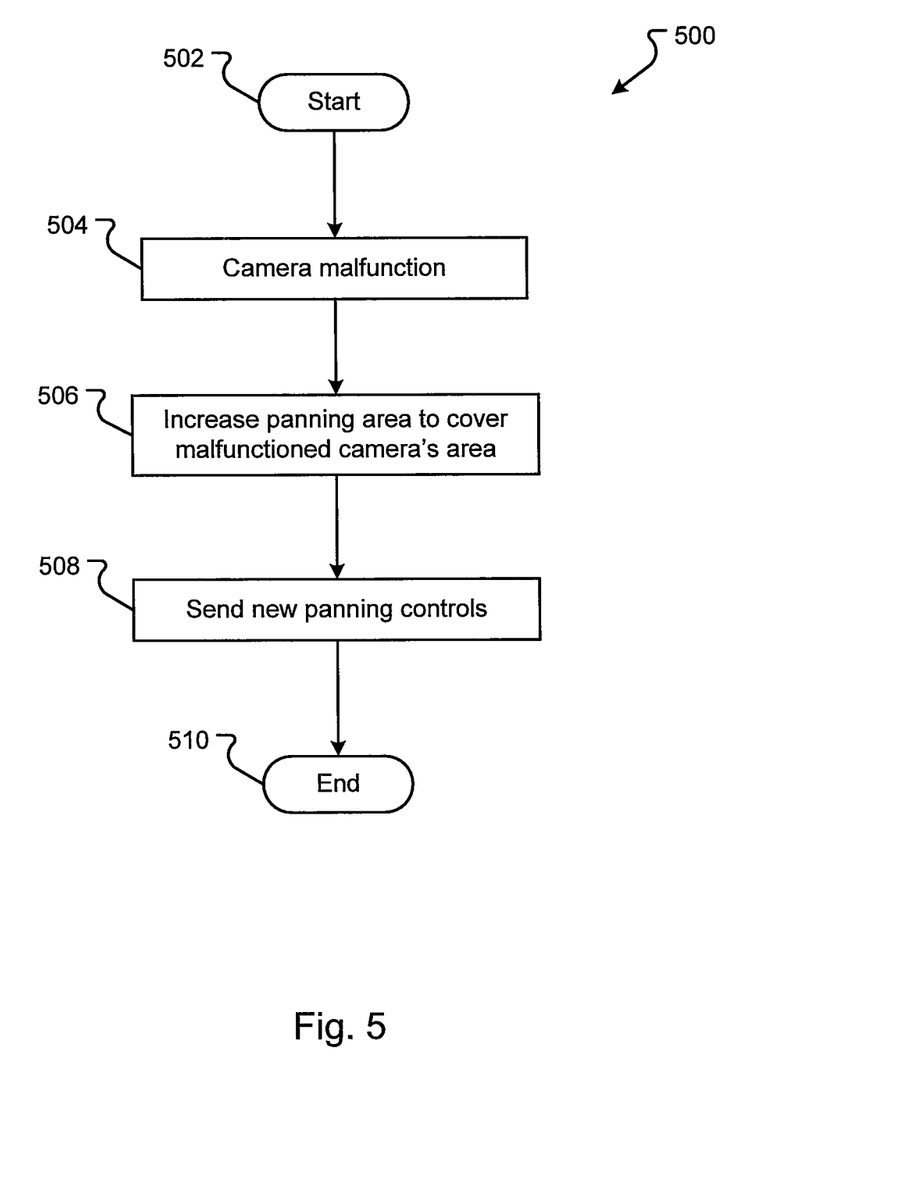
FIG. 5 is a flow diagram of an example embodiment of a process for reacting to a camera malfunction in an interconnected surveillance system.

An embodiment of a method 500 for automatically adjusting to camera malfunction in a network of cameras is shown in FIG. 5. Generally, the method 500 begins with a start operation 502 and terminates with an end operation 510. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-4.

A camera malfunctions in step 504. The malfunctioning camera is a surveillance endpoint, similar or the same as surveillance endpoint 202 or 204. A presence interface 304 of one or more other surveillance endpoints 202 or 204 receives presence information either from the malfunctioning camera or from the presence server 212, as described in conjunction with step 404. Thus, the camera malfunction is detected or determined by an event engine 302 of at least one other camera or other surveillance endpoint. The event engine 302 of the other camera(s) determines that the type of presence event is a malfunction, as described in conjunction with step 406. Then, the event engine(s) 302 of the other camera(s) accesses endpoint information 216 about the malfunctioning camera.

From the information, the event engine 302 of at least one other camera determines an action, as described in conjunction with step 408. The event engine 302 of the other camera(s) determines to increase the panning range to cover the area normally covered by the malfunctioning camera, in step 506. The event engine 302 determines one or more commands for the control elements 308 of the camera. The commands are sent to the endpoint control interface 306 by the event engine 302. The endpoint control interface 306 then sends panning controls to the panning motor, the control element 308, to change the range of the pan, in step 508.

Figure 6:
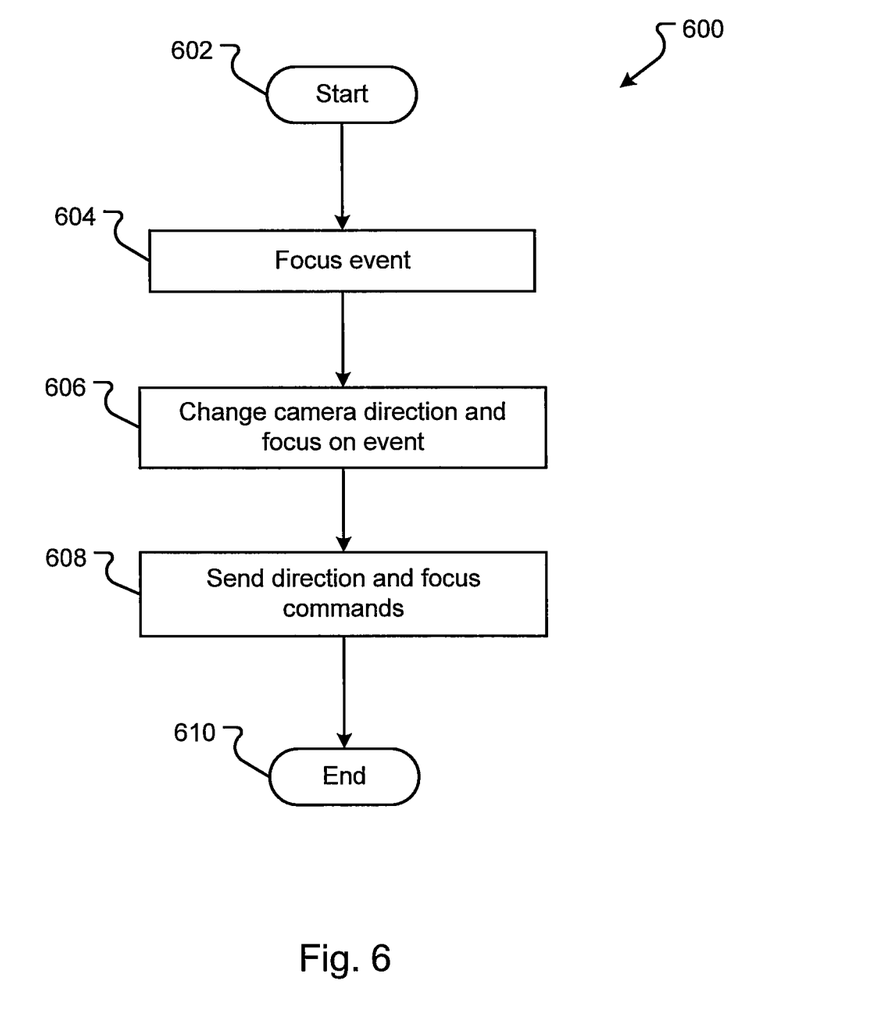
FIG. 6 is a flow diagram of an example embodiment of a process for reacting to a focus event for one camera in an interconnected surveillance system.

An embodiment of a method 600 for automatically adjusting to an event detected by a camera in a network of cameras is shown in FIG. 6. Generally, the method 600 begins with a start operation 602 and terminates with an end operation 610. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, etc. described in conjunction with FIGS. 1-4.

A camera focuses on an event in step 604. The camera is a surveillance endpoint, similar or the same as surveillance endpoint 202 or 204. The event can be something that requires the camera to focus on an individual person or area. Either the camera automatically focuses on the event or human input requires the camera to focus on the event. A presence interface 304 of one or more other surveillance endpoints 202 or 204 receives presence information from the camera or from the presence server 212, as described in conjunction with step 404. Thus, the focus event is detected by an event engine 302 of at least one other camera or other surveillance endpoint. The event engine(s) 302 of the other camera(s) determines that the type of presence event is a focus event, as described in conjunction with step 406. The presence information may also include information about the status of the camera indicating a focus event (e.g., direction of focus, amount of focus, etc.). Then, the event engine(s) 302 of the other camera(s) accesses endpoint information 216 about the camera with the focus event.

From the information, the event engine 302 of at least one other camera determines an action, as described in conjunction with step 408. The event engine(s) 302 of the other camera(s) determines to change the direction of focus and the amount of focus to focus also on the event, in step 606. The event engine 302 determines one or more commands for the control elements 308 of the camera. The commands are sent to the endpoint control interface 306 by the event engine 302. The endpoint control interface 306 then sends panning controls to the panning motor, one control element 308, and to the focus motor, another control element 308, to change the direction and amount of focus, in step 608.

Figure 7:
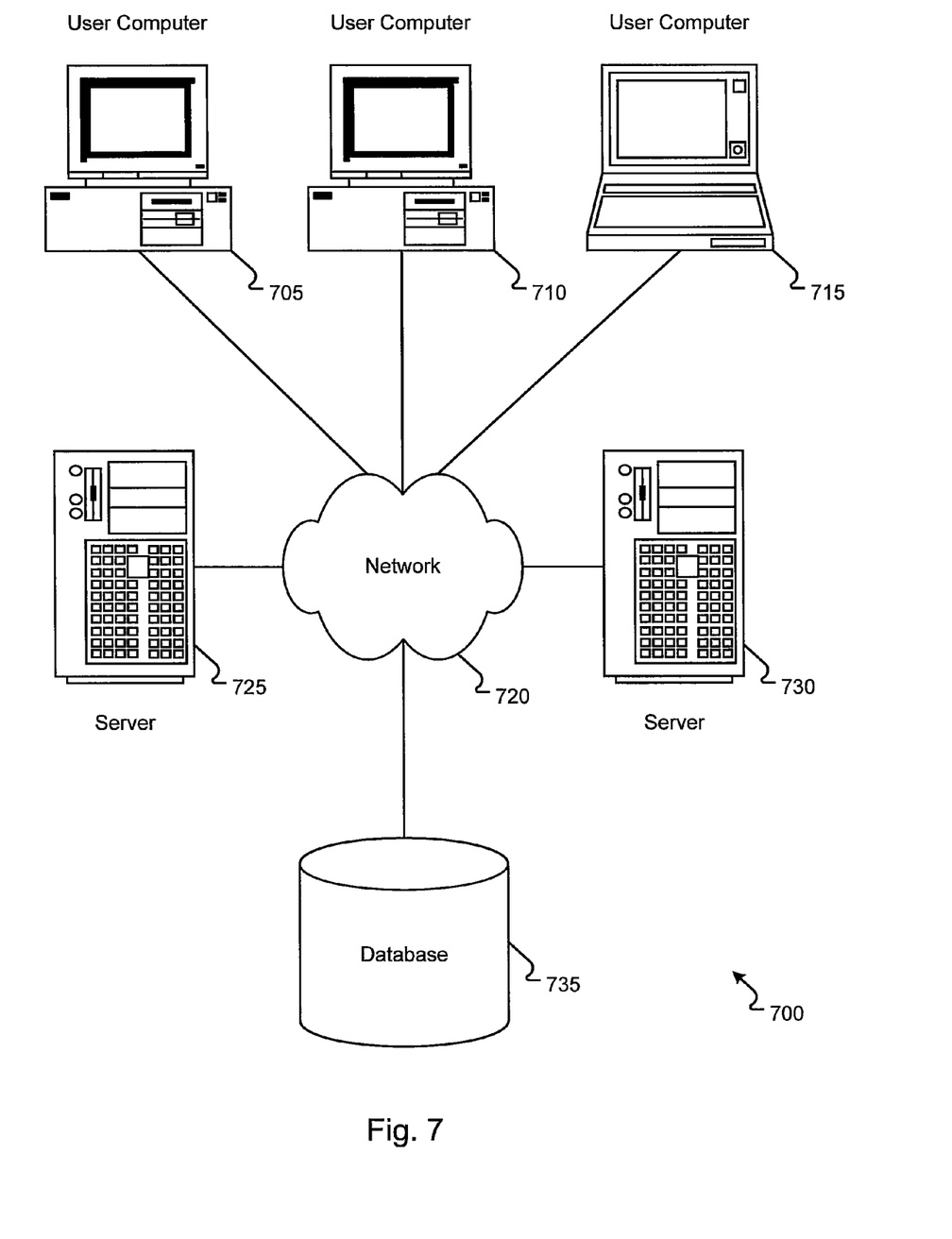
FIG. 7 is a block diagram of an embodiment of a computer system environment in which the systems and methods may be executed.

FIG. 7 illustrates a block diagram of a computing environment 700 that may include the surveillance endpoints 202 or 204, the control server 214, the SIP registrar 210 and/or presence server 212, the recording server 222, or other systems described herein. The environment 700 includes one or more computers 705, 710, and 715. The computers 705, 710, and 715 may be general purpose personal computers (including, merely by way of example, personal computers and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computers 705, 710, 715 may also have any of a variety of applications, including for example, database client and/or server applications, and web browser applications. Alternatively, the computers 705, 710, and 715 may be any other electronic device, such as a thin-client computer, mobile telephone, mobile device, Internet-enabled mobile telephone, and/or personal digital assistant, capable of communicating via a network (e.g., the network 720 described below) and/or displaying and navigating web pages or other types of electronic data. Although the exemplary environment 700 is shown with three computers, any number of computers may be supported.

Environment 700 further includes a network 720. The network 720 may can be any type of network familiar to those skilled in the art that can support data communications using any of a variety of commercially-available protocols, including without limitation TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 702.11 suite of protocols, the Bluetooth® protocol known in the art, and/or any other wireless protocol); and/or any combination of these and/or other networks. The network 720 may be the same as, or similar to, network 116 or other networks allowing communication between the various systems and components described herein.

The environment 700 may also include one or more server computers 725 and 730. The server computers 725 and/or 730 can represent any of the control server 214, the SIP registrar 210 and/or presence server 212, the recording server 222, or other system described herein. One server may be a web server 725, which may be used to process requests for web pages or other electronic documents from user computers 705, 710, and 720. The web server can be running an operating system including any of those discussed above, as well as any commercially-available server operating systems. The web server 725 can also run a variety of server applications, including HTTP servers, FTP servers, CGI servers, database servers, Java servers, and the like. In some instances, the web server 725 may publish operations available operations as one or more web services.

The environment 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C#® or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters.

The environment 700 may also include a database 735, which may be the same or similar to database 216 and/or 218. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i®, that is adapted to store, update, and retrieve data in response to SQL-formatted commands. The database 735 may be operable to store data structure 400.

Figure 8:
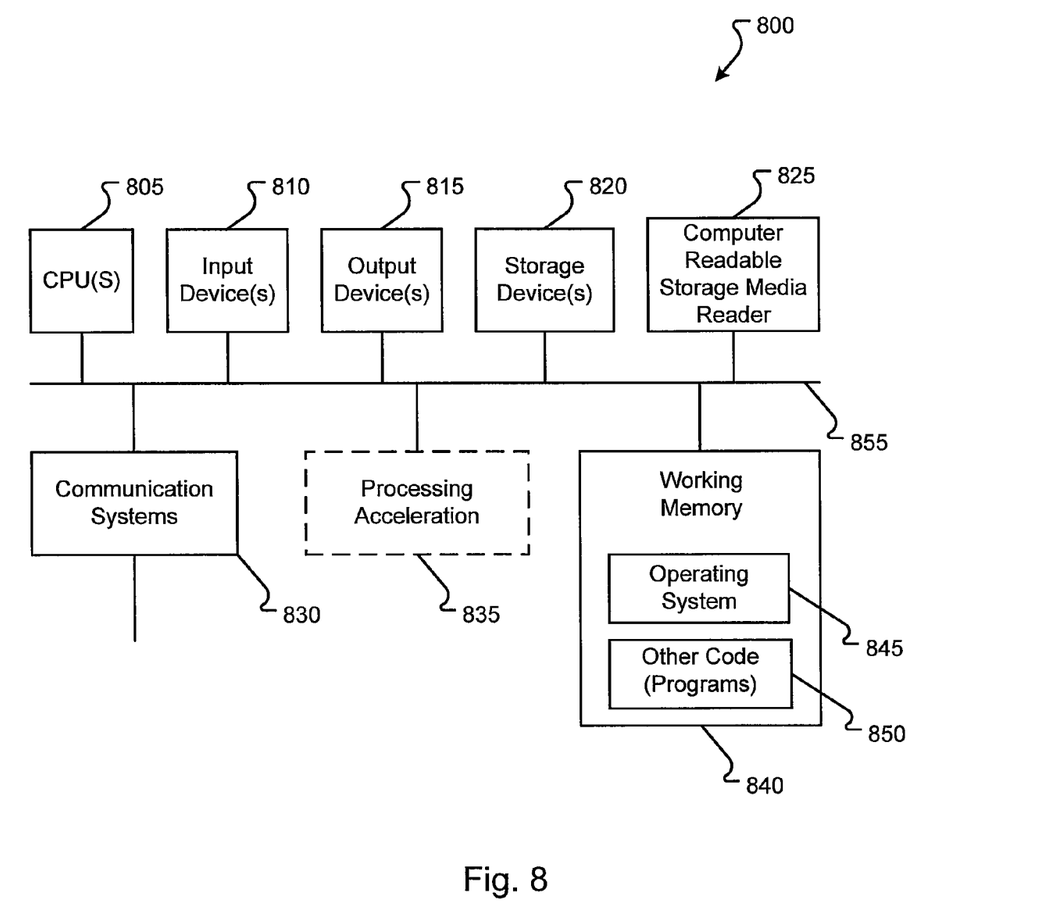
FIG. 8 is a block diagram of a computer system in which the systems and methods may be executed.

FIG. 8 illustrates one embodiment of a computer system 800 upon which the surveillance endpoints 202 or 204, the control server 214, the SIP registrar 210 and/or presence server 212, the recording server 222, or other systems described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices, such as a random access memory ("RAM") and/or a read-only memory ("ROM"), which can be programmable, flash-updateable, and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor, and/or the like The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 and/or any other computer described above with respect to the system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices, and/or other machine readable mediums for storing information.

The computer system 800 may also comprise software elements, shown as being currently located within a working memory 840, including an operating system 845 and/or other code 850, such as program code implementing the components and software described herein. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for adjusting surveillance in a surveillance network comprising three or more surveillance endpoints, the method comprising:

a first surveillance endpoint receiving a plurality of broadcast presence events from a plurality of other surveillance endpoints, wherein one of the plurality of broadcast presence events is from a second surveillance endpoint, wherein the one of the plurality of broadcast presence events is a command to focus on a location of an individual person that the second surveillance endpoint is currently focused on, and wherein the first surveillance endpoint and the second surveillance endpoint are video cameras;

in response to receiving the command to focus on the location of the individual person, the first surveillance endpoint automatically determining, based on the location being within a panning range of the first surveillance endpoint, if the first surveillance endpoint can respond to the command to focus on the location of the individual person; and in response to determining that the first surveillance endpoint can respond to the command to focus on the location of the individual person, the first surveillance endpoint automatically performing an action to focus on the location of the individual person.

2. The method as defined in claim 1, wherein a type of the plurality of broadcast presence events is event tracking.

3. The method as defined in claim 1, wherein the plurality of broadcast presence events are determined based on received presence information.

4. The method as defined in claim 3, wherein the presence information is received from the plurality of other surveillance endpoints.

5. The method as defined in claim 3, wherein the presence information is received from a presence server to which the first surveillance endpoint has registered to receive presence information from the plurality of other surveillance endpoints.

6. The method as defined in claim 1, further comprising the first surveillance endpoint retrieving endpoint information from an endpoint information database, wherein the endpoint information describes the plurality of other surveillance endpoints associated with the plurality of presence events.

7. The method as defined in claim 1, wherein the action further comprises one of a group comprising changing the zoom of the first surveillance endpoint to a determined setting, and changing a panning setting of the first surveillance endpoint.

8. The method of claim 1 wherein: performing the action further comprises:
   the first surveillance endpoint determining one or more additional commands related to the action; and
   the first surveillance endpoint executing the one or more additional commands.

9. The method as defined in claim 1, further comprising sending the one or more additional commands to one or more control elements.

10. The method as defined in claim 9, wherein the one or more control elements control a physical condition of the first surveillance endpoint.

11. The method of claim 1, further comprising: conferencing the first surveillance endpoint and the second surveillance endpoint into a composite multimedia display.

12. A system comprising:
   three or more surveillance endpoints, each comprising a hardware processor in communication with a network, wherein each of the three or more surveillance endpoints are video cameras, and the three or more surveillance endpoints are each operable to:

send its own presence information, in a broadcast message, to two or more other surveillance endpoints in the network;

receive broadcast presence information sent by the two or more other surveillance endpoints from the network, wherein one of the broadcast messages is from a first surveillance endpoint, wherein the one of the broadcast messages includes a command to focus on a location of an individual person that the first surveillance endpoint is currently focused on; and in response to receiving the command to focus on the location of the individual person, a second surveillance endpoint automatically determining, based on the location being within a panning range of the second surveillance endpoint, if the second surveillance endpoint can respond to the command to focus on the location of the individual person.

13. The system as defined in claim 12, further comprising a Session Initiation Protocol (SIP) registrar in communication with the three or more surveillance endpoints, the SIP registrar operable to register the three or more surveillance endpoints and operable to provide presence information to the three or more surveillance endpoints.

14. The system as defined in claim 13, wherein the SIP registrar executes a presence server, the presence server operable to register the three or more surveillance endpoints and operable to provide presence information to the three or more surveillance endpoints.

15. The system as defined in claim 12, further comprising a presence server in communication with the three or more surveillance endpoints, the presence server operable to register the three or more surveillance endpoints and operable to provide presence information to the three or more surveillance endpoints.

16. The system as defined in claim 12, further comprising a recording server in communication with the network, the recording server operable to record one of a group consisting of a composite multimedia display and surveillance data from one or more of the surveillance endpoints.

17. The system as defined in claim 12, further comprising a control server in communication with the network, the control server operable to control automatically one or more of the surveillance endpoints.

18. The system as defined in claim 12, wherein one or more of the surveillance endpoints each comprises:

a presence interface operable to receive or send presence information;

an event engine operable to determine an event occurring at the surveillance endpoint;

an endpoint control interface operable to control one or more control elements; and the one or more control elements operable to change a physical condition of the surveillance endpoint to focus on the individual person.

19. The system of claim 12, wherein the received presence information sent by the two or more other surveillance endpoints are presence tracking events.

20. A first surveillance endpoint including a video camera comprising:

a presence interface operable to receive or send presence information in a broadcast message;

an event engine in communication with the presence interface, the event engine operable to determine an event occurring at the first surveillance endpoint that requires presence information to be sent by the presence interface and operable to determine how to respond to broadcast presence information received from at least two other surveillance endpoints, wherein the at least two other surveillance endpoints are video cameras;

an endpoint control interface in communication with the event engine, the endpoint control interface operable to respond to a command in a broadcast message from one of the other surveillance endpoints to focus on a location of an individual person that the one of the other surveillance endpoints is currently focused on and automatically determine, based on the location of the individual person being within a panning range of the first surveillance endpoint if the first surveillance endpoint can respond to the command to focus on the location of the individual person; and one or more control elements in communication with the endpoint control interface, wherein the one or more control elements change a physical condition of the surveillance endpoint to focus on the location of the individual person.

* * * * *